(12) United States Patent
Tanigawa

(10) Patent No.: US 10,348,920 B2
(45) Date of Patent: Jul. 9, 2019

(54) IMAGE PROCESSING DEVICE AND METHOD FOR ADJUSTING A FOLD POSITION OF A FOLD UNIT

(71) Applicant: FUJI XEROX Co., Ltd., Tokyo (JP)

(72) Inventor: Tomohiro Tanigawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/946,047

(22) Filed: Apr. 5, 2018

(65) Prior Publication Data

US 2019/0075206 A1 Mar. 7, 2019

(30) Foreign Application Priority Data

Sep. 6, 2017 (JP) .................. 2017-171096

(51) Int. Cl.
  *B65H 37/06* (2006.01)
  *H04N 1/00* (2006.01)
  *G03G 15/20* (2006.01)
  *B65H 43/08* (2006.01)
  *B42C 3/00* (2006.01)

(52) U.S. Cl.
  CPC ............. *H04N 1/0066* (2013.01); *B42C 3/00* (2013.01); *B65H 37/06* (2013.01); *B65H 43/08* (2013.01); *G03G 15/2064* (2013.01); *H04N 1/00639* (2013.01)

(58) Field of Classification Search
  CPC .......... B42C 3/00; B65H 37/06; B65H 43/08; H04N 1/00702; H04N 1/00761; H04N 1/0066; H04N 1/00639; G03G 15/2064
  See application file for complete search history.

(56) References Cited

U.S. PATENT DOCUMENTS

| | | | | |
|---|---|---|---|---|
| 7,896,328 B2* | 3/2011 | Kawamura | ........ | G03G 15/6538 270/32 |
| 8,159,721 B2* | 4/2012 | Lee | ...................... | G06K 9/3283 358/3.26 |
| 8,411,312 B2* | 4/2013 | Kanzawa | ................... | B41J 3/44 358/1.12 |
| 8,570,595 B2* | 10/2013 | Nagakoshi | ........... | H04N 1/0044 358/1.12 |
| 9,641,705 B2* | 5/2017 | Noguchi | ............ | H04N 1/00336 |
| 9,779,337 B2* | 10/2017 | Kuto | .................. | G06K 15/1828 |

(Continued)

FOREIGN PATENT DOCUMENTS

| | | |
|---|---|---|
| JP | 2012-151586 A | 8/2012 |
| JP | 2016-158113 A | 9/2016 |
| JP | 2017-061385 A | 3/2017 |

*Primary Examiner* — Patrick H Mackey
(74) *Attorney, Agent, or Firm* — Sughrue Mion, PLLC

(57) ABSTRACT

An image processing device includes: a fold unit that folds an adjustment sheet, in which an adjustment pattern is formed, over the adjustment pattern based on a predetermined reference fold position; an image reader that reads an image of the adjustment pattern of the adjustment sheet with the adjustment sheet folded by the fold unit unfolded; a position identifying unit that, based on a fold line which appears in the image of the adjustment pattern read by the image reader, identifies a position of the fold line; and a fold position adjusting unit that adjusts a fold position of the fold unit based on a difference between the position of the fold line identified by the position identifying unit and the reference fold position.

15 Claims, 9 Drawing Sheets

FIG. 10

(56) References Cited

U.S. PATENT DOCUMENTS

| | | | |
|---|---|---|---|
| 2008/0170262 A1* | 7/2008 | Takahashi | G03G 15/6538 358/1.15 |
| 2013/0045851 A1* | 2/2013 | Hori | G03G 15/5095 493/405 |
| 2015/0110527 A1* | 4/2015 | Matsuzaki | G03G 15/2014 399/297 |
| 2015/0239704 A1* | 8/2015 | Ooba | G03G 15/6582 493/405 |
| 2015/0306894 A1* | 10/2015 | Wertheimer | A63H 33/38 281/38 |

\* cited by examiner

FIG. 5A

SELECTION OF ADJUSTMENT ITEM
   PLEASE SELECT ADJUSTMENT ITEM.

| ALIGNMENT ADJUSTMENT |
| TRANSFER VOLTAGE ADJUSTMENT |
| FINISHER ADJUSTMENT |

FIG. 5B

FOLD POSITION ADJUSTMENT
(SELECTION OF FOLD PATTERN)
   PLEASE SELECT FOLD PATTERN
   TO BE ADJUSTED.

| HALF FOLD |
| INNER TRIPLE FOLD |
| Z FOLD |
| CREASING |
⋮

FIG. 5C

FOLD POSITION ADJUSTMENT
(SELECTION OF PAPER)
   PLEASE SELECT PAPER TO BE ADJUSTED.

| TRAY 1: PLAIN PAPER |
| TRAY 2: HEAVY PAPER |
| TRAY 3: COATED PAPER |
| TRAY 4: THIN PAPER |
⋮

( START TO GENERATE ADJUSTMENT SHEET )

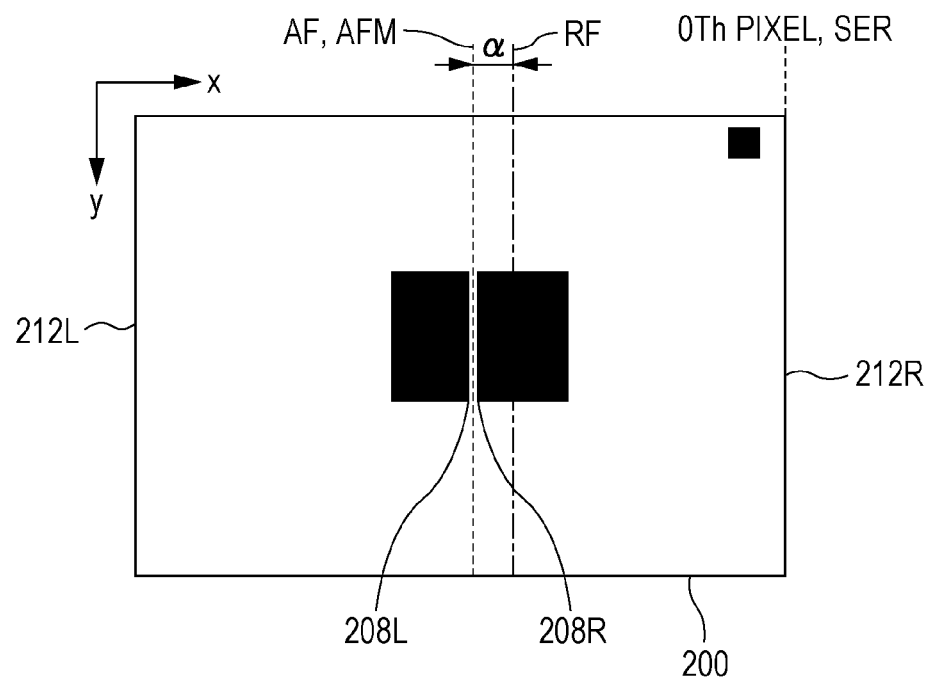

IMAGE PROCESSING DEVICE AND METHOD FOR ADJUSTING A FOLD POSITION OF A FOLD UNIT

CROSS-REFERENCE TO RELATED APPLICATIONS

This application is based on and claims priority under 35 USC 119 from Japanese Patent Application No. 2017-171096 filed on Sep. 6, 2017.

BACKGROUND

Technical Field

The present invention relates to an image processing device, and an image forming device and a method.

SUMMARY

According to an aspect of the invention, there is provided an image processing device including: a fold unit that folds an adjustment sheet, in which an adjustment pattern is formed, over the adjustment pattern based on a predetermined reference fold position; an image reader that reads an image of the adjustment pattern of the adjustment sheet with the adjustment sheet folded by the fold unit unfolded; a position identifying unit that, based on a fold line which appears in the image of the adjustment pattern read by the image reader, identifies a position of the fold line; and a fold position adjusting unit that adjusts a fold position of the fold unit based on a difference between the position of the fold line identified by the position identifying unit and the reference fold position.

BRIEF DESCRIPTION OF THE DRAWINGS

Exemplary embodiments of the present invention will be described in detail based on the following figures, wherein:

FIGS. 5A to 5C are diagrams illustrating an example of a setting screen for the fold position adjustment processing;

FIGS. 9A and 9B illustrate an example of a pattern used for pattern matching when the position of a fold line is identified; and FIG. 10 is an explanatory diagram for the difference between the position of a fold line and a reference fold position.

DETAILED DESCRIPTION

Hereinafter, an exemplary embodiment of the invention will be described with reference to the drawings.

Figure 1:
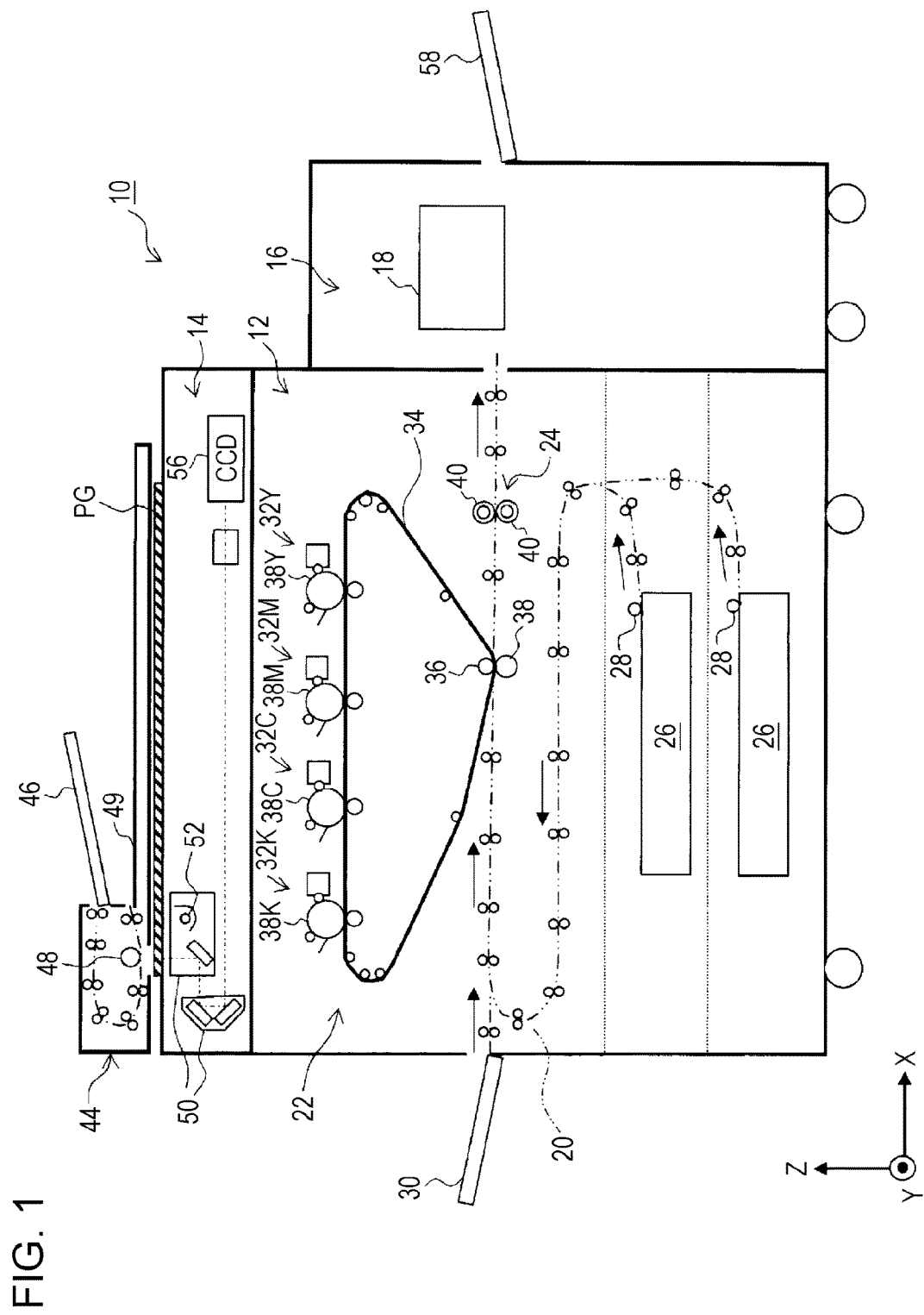
FIG. 1 is a schematic configuration diagram of an image processing device.

FIG. 1 is a schematic configuration diagram of an image processing device in this exemplary embodiment. An image processing device 10 includes an image former 12 that forms an image on recording paper, an image reader 14 which is an image scanner that reads the image of a document, and a post processor 16 which is a finisher that performs fold processing on the recording paper.

The image processing device 10 in this exemplary embodiment is, for instance, a copy machine that has a copy function of forming an image of a document on the recording paper by the image former 12, the document being read by the image reader 14. Also, the image processing device 10 in this exemplary embodiment is connected to, for instance, a personal computer (hereinafter referred to as a PC) via a network, and performs printing by the image former 12 based on image data inputted as a print job from a PC. The image processing device 10 receives an instruction for fold processing to be performed on the recording paper from a user interface (hereinafter referred to as a UI) provided in the device body or a PC, and a fold unit 18 of the post processor 16 performs fold processing on the recording paper. As described below, the image processing device 10 adjusts the position of a fold line of the recording paper by the fold unit 18. It is to be noted that in the present description, the "recording paper" is not limited to a sheet (medium) on which an image is formed, and includes a sheet on which an image is not formed.

The image former 12 includes a transport path 20 for transporting the recording paper, a toner image former 22 that forms a toner image on the recording paper, and a fixing unit 24 that fixes a toner image on the recording paper. Also, the image processing device 10 includes multiple sheet trays 26 in which sheets of recording paper are to be stored. Although FIG. 1 illustrates two sheet trays 26, actually more than two sheet trays 26 are provided. In each of the sheet trays 26, sheets of recording paper are stored according to a type (kind) of the recording paper, for instance.

The uppermost sheet of recording paper among multiple sheets of recording paper stored in the sheet trays 26 is to be delivered to the transport path 20 by a delivery roller 28. The transport path 20 has one end connected to each sheet tray 26 and the other end connected to a transport path (not illustrated) of the post processor 16 through the toner image former 22. Thus, the recording paper delivered from the sheet trays 26 to the transport path 20 is transported to the toner image former 22, and subsequently, is transported to the post processor 16 through the fixing unit 24.

As illustrated in FIG. 1, the image processing device 10 includes a bypass tray 30. The recording paper placed on the bypass tray 30 is also delivered to the transport path 20, and is transported to the toner image former 22, and subsequently, is transported to the post processor 16 through the fixing unit 24.

The toner image former 22 includes developing units 32Y, 32M, 32C, and 32K having respective colors of yellow (Y), magenta (M), cyan (C), and black (K), and an endless transfer belt 34 as an intermediate retention body. The transfer belt 34 is wound around multiple rollers including the transfer roller 36 near the transport path, and is rotationally driven. Also, the transfer belt 34 is in contact with photoconductor drums 38Y, 38M, 38C, and 38K which are provided in the developing units 32Y, 32M, 32C, and 32K.

The toner image former 22 is to receive input of image signals (raster data) having respective colors of Y, M, C, and K generated based on image data. The toner image former 22 forms toner images in colors of Y, M, C, and K in the respective photoconductor drums 38Y, 38M, 38C, and 38K of the developing units 32Y, 32M, 32C, and 32K based on the image signals, and the toner images are superimposed on the transfer belt 34 and transferred.

In the transfer roller 36, a roller 38 (bias transfer roller) is provided to be opposed to the transfer roller 36, and the recording paper is delivered between the transfer roller 36 and the roller 38, and is sandwiched between the transfer roller 36 and the roller 38 along with the transfer belt 34. Consequently, the recording paper is delivered while toner images of the transfer belt 34 are being transferred to the recording paper.

The fixing unit 24 includes a pair of fixing rollers 40, and the recording paper on which toner images have been transferred is delivered between the fixing rollers 40. The fixing unit 24 sandwiches the recording paper, which is delivered between the fixing rollers 40, between the fixing rollers 40, heats the recording paper while pressurizing the recording paper, and delivers the recording paper on which toner images are fixed. Consequently, an image according to the image data is formed on the recording paper.

A general configuration using an electrophotographic system may be applied to the image former 12 described above, and a detailed description is omitted.

The image processing device 10 includes an automatic document transporter 44. The automatic document transporter 44 is supported on a platen glass PG which is a document base on the upper surface of the image reader 14 (image scanner). The automatic document transporter 44 has a document sheet supply tray 46 in which multiple documents having an image to be read are placed in the stack. Each of multiple documents placed in the document paper supply tray 46 is sequentially passed through a copy position on the platen glass PG, in other words, a pressure-contact position of a platen roller 48 of the document transporter 44, and is discharged to a document paper output tray 49. The automatic document transporter 44 is rotatable with respect to the platen glass PG upper surface around a rotation shaft (not illustrated) provided at the rear end, which extends in a crosswise direction (the X-axis direction of FIG. 1). When a user or the like places a document on the platen glass PG by a hand, the automatic document transporter 44 is rotated upward.

The image reader 14 is disposed below the platen glass PG, and includes an exposure optical system 50 that reads a document image. The exposure optical system 50 includes a light source 52 and multiple mirrors. A document transported to the platen glass PG upper surface and passed through a copy position by the automatic document transporter 44 or a document manually placed on the platen glass PG is irradiated with light from a light source, and a reflection light from the document is passed through the exposure optical system 50 and converted to an electrical signal by a solid-state imaging charge coupled device (CCD) 56. It is to be noted that when an image of a manually placed document on the platen glass PG is read, the exposure optical system 50 moves in the X-axis direction of FIG. 1, and scans the document.

A general configuration of, for instance, a CCD image scanner may be applied to the image reader 14 described above, and a detailed description is omitted.

The finisher in the post processor 16 includes the fold unit 18 that performs fold processing on the recording paper transported from the image former 12, and a discharge tray 58. The fold unit 18 folds the recording paper by a set folding method such as half fold, inner triple fold, Z fold, and discharges the folded recording paper to the discharge tray 58. It is to be noted that the post processor 16 may include a booklet creator (not illustrated) that creates a booklet by stacking multiple sheets of recording paper, saddle stitching the stacked sheets of recording paper, and half-folding the sheets of recording paper, and a stapler (not illustrated) that stacks multiple sheets of recording paper, and staples the stacked sheets of recording paper at a predetermined position of the peripheral edge. A publicly known configuration in related art may be applied to the fold unit 18, the booklet creator, and the stapler.

Figure 2A:
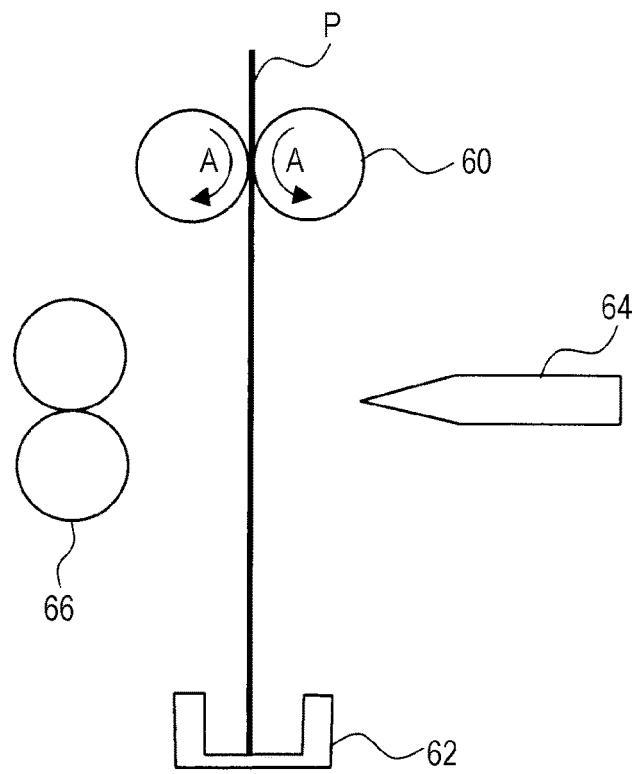
FIGS. 2A and 2B are schematic diagrams of an example of the mechanism of a fold unit.
Figure 2B:
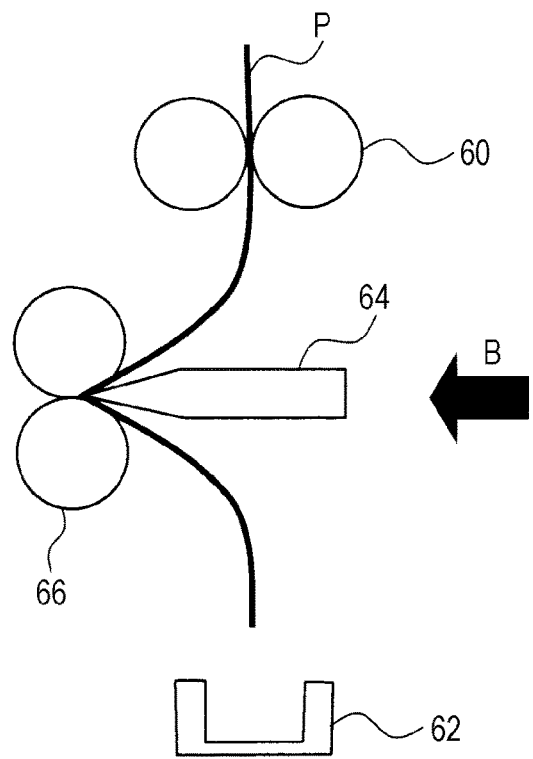

FIGS. 2A and 2B are schematic diagrams of an example of the mechanism of the fold unit 18.

As illustrated in FIG. 2A, recording paper P is transported by a pair of transport rollers 60 which are rotated in the direction of an arrow A, and is bumped against a gate 62. When the recording paper P is bumped against the gate 62, transportation is stopped. When the transportation is stopped, as illustrated in FIG. 2B, a knife-shaped folding member 64 moves to a pair of folding rollers 66 in the direction of an arrow B, and pushes the recording paper P into the pair of folding rollers 66. Consequently, the recording paper P is folded by the folding rollers 66.

The fold position of the recording paper P depends on, for instance, the amount of deflection of the recording paper pushed out from the pair of transport rollers 60. The recording paper P may be deflected depending on paper characteristics (such as the thickness, and the degree of elasticity of recording paper P), and the amount of deflection may vary. Thus, the fold position has to be adjusted according to the paper characteristics of the recording paper P. It is to be noted that the fold position of the recording paper P may vary due to a factor other than the "amount of deflection" mentioned above.

Figure 3:
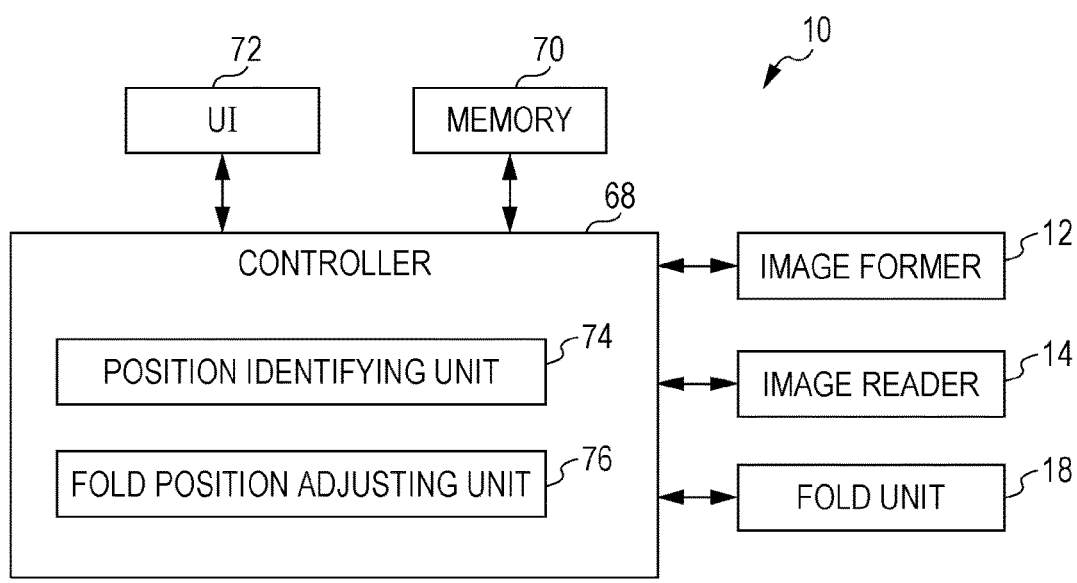
FIG. 3 is a diagram illustrating a control configuration of fold position adjustment processing of the image processing device.

FIG. 3 is a block diagram illustrating the control configuration of fold position adjustment processing of the image processing device 10 in this exemplary embodiment. The image processing device 10 includes a controller 68, a memory 70, and a user interface (UI) 72. The controller 68 includes a processor such as a CPU, and executes processing in accordance with a program stored in the memory 70. Thus, the controller 68 functions as the later-described position specifying unit 74, and fold position adjusting unit 76. The memory 70 is a ROM, a RAM, or a flash memory, and stores a program executed by the controller 68, an adjustment value determined by the fold position adjustment processing, and temporary data. The UI 72 displays a setting screen in the fold position adjustment processing, and receives an operation from a user or a serviceman or the like (hereinafter referred to as a user). The controller 68 is connected to the image former 12, the image reader 14, and the fold unit 18, and can control each of these components.

Figure 4:
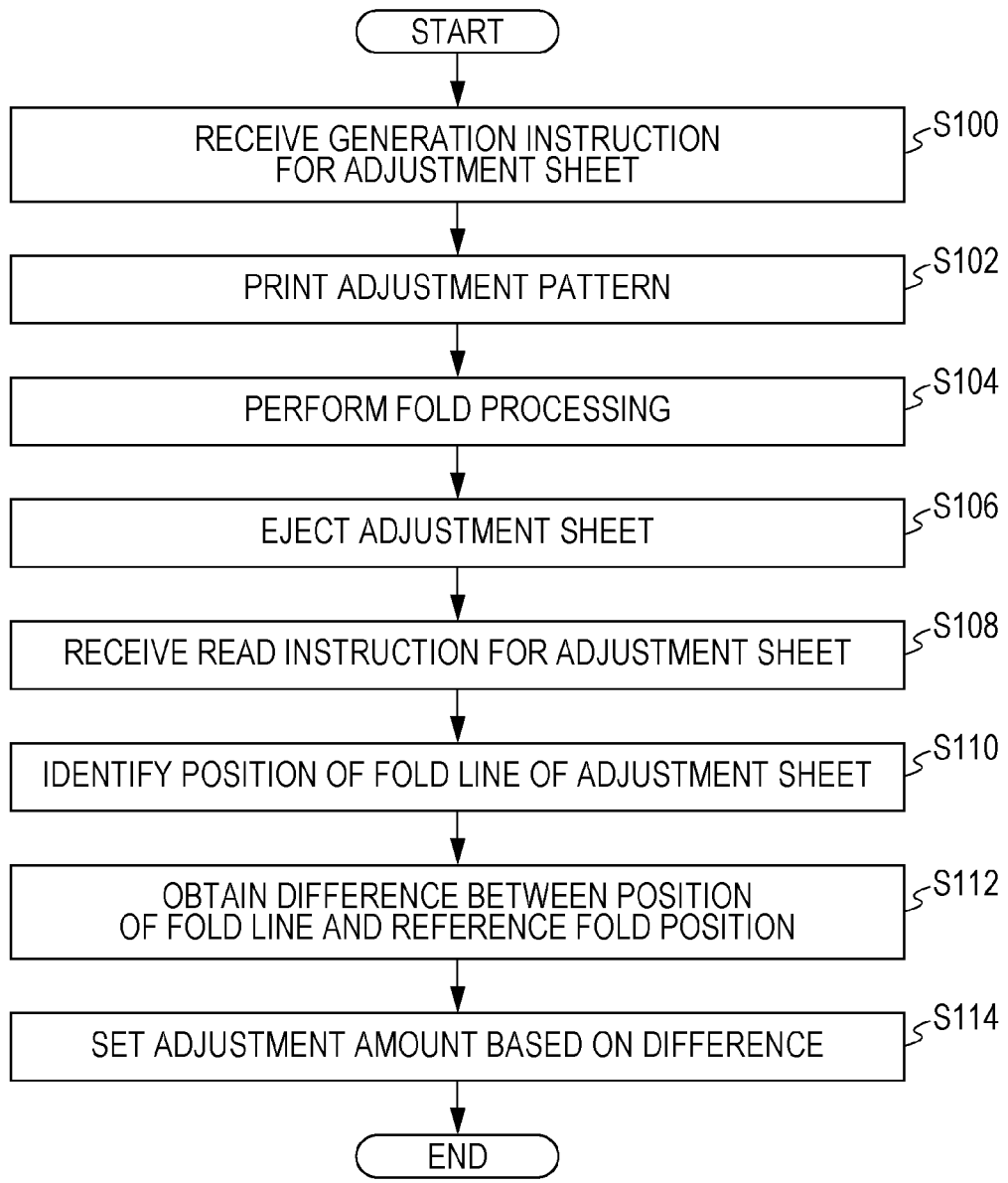
FIG. 4 is a flowchart illustrating the flow of the fold position adjustment processing of the image processing device.

FIG. 4 is a flowchart illustrating the flow of the fold position adjustment processing of the image processing device 10. In this exemplary embodiment, the fold position adjustment processing is performed by executing the flow of FIG. 4 for each of the types of recording paper and for each of the fold patterns of recording paper.

First, in S100, the controller 68 receives a generation instruction for an adjustment sheet via the UI 72. FIGS. 5A to 5C are each an example of a setting screen of the fold position adjustment processing and an adjustment sheet generation instruction receiving screen displayed on the UI 72. First, a selection screen for adjustment item illustrated in FIG. 5A is displayed, and "finisher adjustment" is selected by a user, for instance. Next, a selection screen for fold pattern illustrated in FIG. 5B is displayed, and a fold pattern to be adjusted is selected by a user. Next, a selection screen for recording paper (paper) illustrated in FIG. 5C is displayed, and recording paper to be adjusted is selected by a user. When the "start to generate adjustment sheet" button illustrated in FIG. 5C is touched, a generation instruction for an adjustment sheet is received. When a generation instruction for an adjustment sheet is received, the controller 68 controls the image former 12, supplies the recording paper from the paper tray 26 which stores the recording paper (paper) selected in FIG. 5C, and delivers the recording paper to the transport path 20. It is also possible for a user to place the recording paper selected in FIG. 5C in the bypass tray 30, and to supply the recording paper from the bypass tray 30 by touching the "start to generate adjustment sheet" button, and to deliver the recording paper to the transport path 20. The supplied recording paper serves as an adjustment sheet. The adjustment sheet may also be referred to as the "sheet".

Figure 6A:
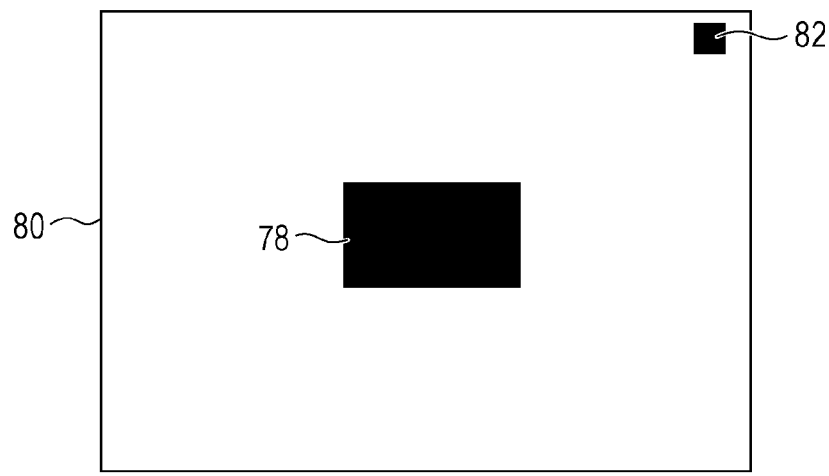
FIG. 6A is an example of an adjustment sheet on which an adjustment pattern is printed.

Next, in S102 of FIG. 4, the controller 68 controls the image former 12 so that a predetermined adjustment pattern is printed on the recording paper (adjustment sheet) supplied from the paper tray 26 or the bypass tray 30. FIG. 6A is a diagram illustrating an example of an adjustment sheet 80 on which an adjustment pattern 78 is printed. The adjustment pattern 78 in this exemplary embodiment is a pattern (patch) that is filled with color at a fixed concentration, and is printed (formed) in at least part of the area in which the adjustment sheet 80 is folded by the fold unit 18 of the post processor 16. It is to be noted that the mark printed in a corner area of the adjustment sheet 80 of FIG. 6A indicates an edge (reference edge mark) as a reference in the crosswise direction of FIG. 6A.

Although the adjustment pattern 78 is printed near the center of the adjustment sheet 80 in FIG. 6A, the adjustment pattern 78 may be printed near the upper side, the lower side, or from the upper side to the lower side. Also, the width (the width in the crosswise direction in FIG. 6A) of the adjustment pattern 78 is not limited to the what is illustrated in FIG. 6A, and may be narrower or wider than the what is illustrated in FIG. 6A (for instance, the width of the adjustment pattern 78 which is printed over the entire length in the crosswise direction of the adjustment sheet 80).

The adjustment pattern 78 is printed with toner of K color only, for instance. Alternatively, the adjustment pattern 78 is printed in black using toner obtained by mixing, for instance, C color, M color, and Y color toners. Alternatively, the adjustment pattern 78 may be gray color at a predetermined concentration, or a color other than black, at a predetermined concentration. The color of the adjustment pattern 78, and the position of the adjustment pattern 78 on the adjustment sheet 80 are pre-stored in the memory 70, for instance. It is to be noted that "fixed concentration" in "an adjustment pattern filled with color at a fixed concentration" does not necessarily mean that the concentration is fixed in a strict sense, and includes, for instance, a varied concentration which may occur due to a design or an operation.

Figure 6B:
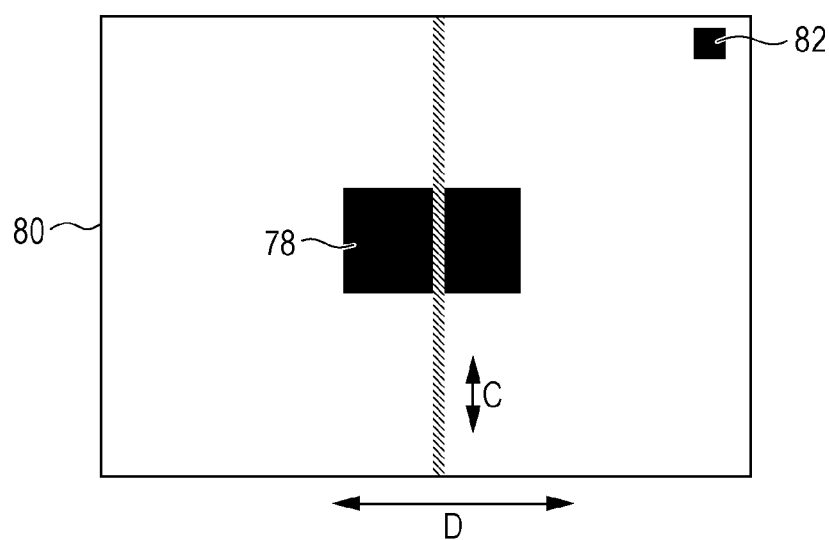
FIG. 6B is an example of a state of the adjustment sheet on which fold processing is performed.

In S102 of FIG. 4, after an adjustment pattern is printed on the adjustment sheet, the adjustment sheet is delivered to the post processor 16. In S104, the controller 68 controls the fold unit 18 so that fold processing is performed on the adjustment sheet. The fold processing is performed using a fold pattern selected in FIG. 5B. FIG. 6B illustrates an example of the adjustment sheet 80 on which the half fold processing is performed after "half fold" is selected in FIG. 5B. The fold position is illustrated by an oblique line in FIG. 6B. The fold position of the adjustment sheet 80 is pre-stored as a reference fold position in the memory 70, for instance. In other words, the reference fold position is a predetermined fold position. Although the fold unit 18 performs fold processing on the adjustment sheet 80 in accordance with a reference fold position, an actual fold position may deviate from the reference fold position. Here, the fold unit 18 performs fold processing across the adjustment pattern 78. It is to be noted that as illustrated in FIG. 6B, a reference edge mark 82 indicates an edge as a reference in a direction (crossing direction) D crossing a direction C along the fold of the adjustment sheet 80.

Figure 7:
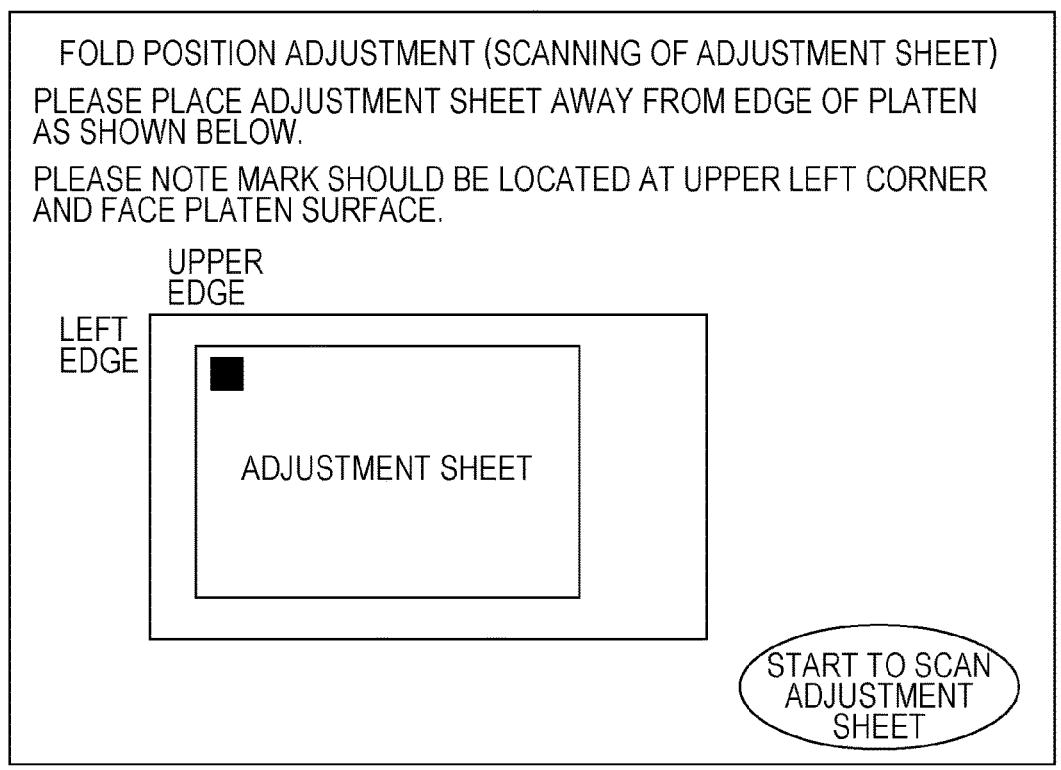
FIG. 7 illustrates an example of a guide screen when an adjustment sheet in the fold position adjustment processing is placed on a platen glass.

Next, in S106 of FIG. 4, the controller 68 discharges the adjustment sheet folded by the fold unit 18 to the discharge tray 58. A user then unfolds the adjustment sheet (folded adjustment sheet) discharged from the discharge tray 58, and places the unfolded adjustment sheet on the platen glass PG (also simply referred to as the platen PG) at an upper portion of the image reader 14. FIG. 7 is an example of a guide screen when an adjustment sheet displayed on the UI 72 is placed on the platen glass PG. As illustrated in FIG. 7, the UI 72 displays guidance indicating that an adjustment sheet should be placed away from the edge of the platen glass PG (platen PG). Also, guidance is displayed, which indicates that the reference edge mark (■ mark) printed in a corner area of the adjustment sheet should be located at an upper left corner, and the side of the adjustment sheet, on which the reference edge mark (and the adjustment pattern) are printed, should face the platen glass PG surface. A user opens and places the adjustment sheet on the platen glass PG in accordance with the guidance.

Next, in S108 of FIG. 4, the controller 68 receives a read instruction for adjustment sheet via the UI 72. Specifically, when the "start to scan adjustment sheet" button illustrated in FIG. 7 is touched, a read instruction for adjustment sheet is received. The controller 68 controls the image reader 14 so that an image on the adjustment sheet is read. Specifically, the exposure optical system 50 of the image reader 14 moves to scan the adjustment sheet, thereby reading an image on the adjustment sheet. In this manner, the image reader 14 reads the image of an adjustment pattern of the adjustment sheet with the adjustment sheet folded by the fold unit 18 unfolded.

Figure 8:
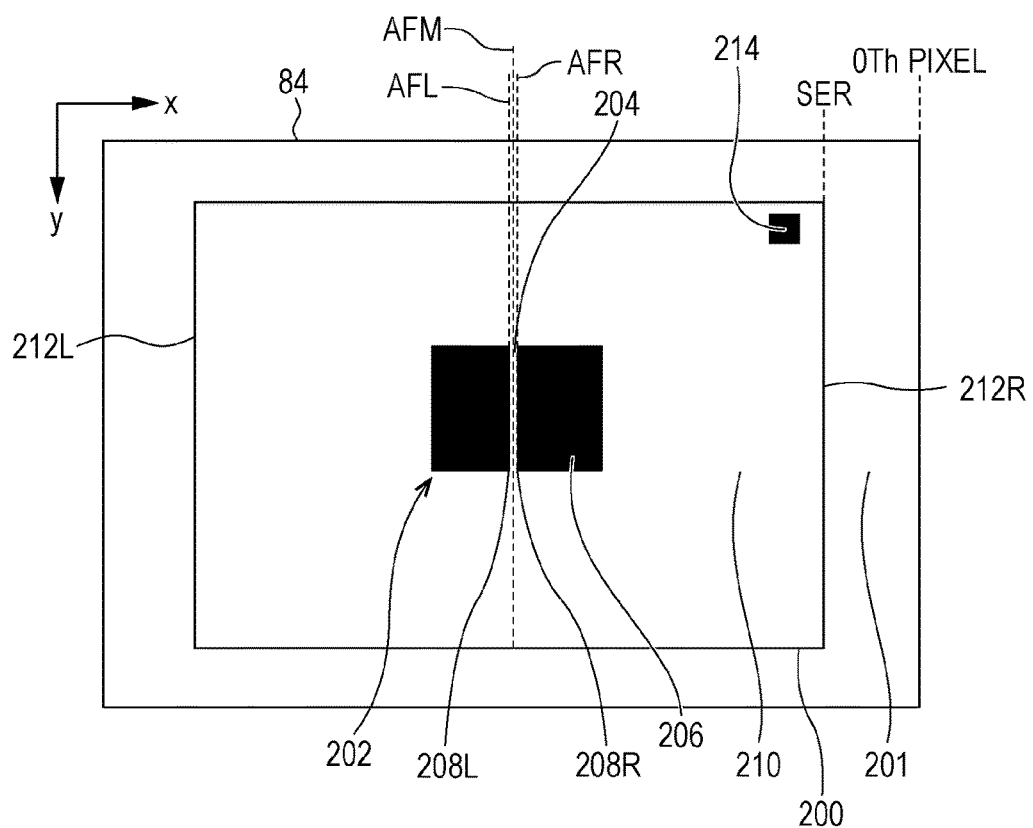
FIG. 8 illustrates an example of an image of an adjustment pattern of an adjustment sheet which is read.

FIG. 8 illustrates an example of an image 84 of an adjustment pattern which is read. When the image of the read adjustment pattern is a color image, the adjustment pattern may be converted from a color image into a monochrome image by a publicly known method in related art. FIG. 8 illustrates an image after the conversion. As illustrated in FIG. 8, since the adjustment sheet is placed away from the edge of the platen glass PG, the image 84 of the adjustment pattern includes an outside area 201 of an adjustment sheet 200. In other words, the outer area (edge portion) of the adjustment sheet appears in the image 84 of the adjustment pattern.

In the image 84 of the adjustment pattern, an area 204 including a fold line appears in white color or a color with a low concentration in an area 202 of the adjustment pattern. As factors of this phenomenon, for instance, the following two factors may be considered. The first factor is that the toner on the fold line is separated because the adjustment sheet is folded. In other words, the toner on a fold line portion of the adjustment pattern filled with color at a fixed concentration is separated, and thus the fold line remarkably appears in the image of the adjustment pattern. The second factor is that when the adjustment sheet is placed on the platen glass PG, a fold line portion is floated from the platen glass PG, and the angle of reflection light changes at the fold line portion. Thus, the image reader 14 receives specular reflection light which is not supposed to be received by the image reader 14. The controller 68 identifies the position of the fold line in the adjustment sheet by identifying the position of white color appearing in the image 84 of the adjustment pattern or a color with a low concentration.

Returning to FIG. 4, in S110, the controller 68 functions as the position specifying unit 74, and identifies the position of the fold line based on the fold line which appears in the image of the adjustment pattern. As illustrated in FIG. 8, change portions 208L, 208R are present in the crosswise direction (the x-axis direction), in which color changes from black color of the adjustment pattern 206 (or a color with a high concentration) to white color (or a color with a low concentration) which indicates an area of the fold line. The area 204 including the fold line is between the change portion 208L and the change portion 208R. In other words, The area 204 including the fold line is the area in which the concentration significantly decreases in a crossing direction (the x-axis direction of FIG. 8 or a direction nearly parallel to the x-axis direction) crossing the direction (the vertical direction of FIG. 8 (the y-axis direction) or a direction nearly parallel to the vertical direction) along the fold of the adjustment sheet. The position specifying unit 74 of the controller 68 identifies a predetermined position of the area in which the concentration significantly decreases in the crossing direction, as the position of the fold line.

Although it is assumed in the above description that the area 204 including a fold line is present, in other words, a fold line having a width is present, a situation may occur in which a fold line having a width does not appear. In this case, the position specifying unit 74 of the controller 68 identifies the "position" at which the concentration significantly decreases, as the position of the fold line.

Next, an example of an identification method for the position of a fold line will be described. Change portions 212L, 212R are present in the crosswise direction (the x-axis direction) of FIG. 8, in which color changes from black color of the outside area 201 of the adjustment sheet 200 (or a color with a high concentration) to white color (or a color with a low concentration) of an inside area 210 of the adjustment sheet 200. The controller 68 can identify the positions of the change portions 212L, 212R, for instance, by a publicly known pattern matching in related art. Similarly, the positions of the change portions 208L, 208R of the above-described area 204 including a fold line can be identified. It is to be noted that the position herein indicates a pixel position in the crosswise direction (the x-axis direction) of FIG. 8.

In the example described here, the pixel position of the change portion 212L on the side (the left side) on which the reference edge mark 214 is not present in the crosswise direction (the x-axis direction) of the adjustment sheet 200 is not identified. In other words, the pixel position of the change portion 212R on the side (the right side) on which the reference edge mark 214 is present in the crosswise direction (the x-axis direction) of the adjustment sheet is identified, and the position of the fold line is identified based on the pixel position. In this exemplary embodiment, due to the presence of the reference edge mark 214, the edge serving as the reference (the reference edge) in the x-axis direction of the adjustment sheet is clear.

The identification of the pixel positions of the change portions 212R, 208L, and 208R by pattern matching is made in the following manner: for instance, 2×1 pixel pattern as illustrated in FIGS. 9A and 9B is scanned on the image of the adjustment pattern, and the positions, at which the condition of 2×1 pixel pattern is satisfied, are identified as the change portions 212R, 208L, and 208R. For instance, when each pixel value of the image 84 of the adjustment pattern has a value of one of 0 (black) to 255 (white), the pixel positions of the change portions 212R, 208R are identified by scanning the pattern illustrated in FIG. 9A in the x-axis direction of FIG. 8. Also, the pixel position of the change portion 208L is identified by scanning the pattern illustrated in FIG. 9B in the x-axis direction of FIG. 8. It is to be noted that the scanning may be performed at multiple positions in the vertical direction (the y-axis direction) of FIG. 8, and an average value of multiple pixel positions (multiple pixel positions in the x-axis direction for a change portion) obtained by the scanning may be set to the pixel position of the change portion. Alternatively, an approximation line (an approximation line extending in the y-axis direction) approximated by the least square method may be determined from multiple pixel positions, and the pixel position of the change portion may be determined based on the approximation line. It is to be noted that as illustrated in FIG. 8, the pixel position is determined so that the position at the right edge of the image 84 of the adjustment pattern is the 0th pixel. This is because the right side on which the reference edge mark 214 is present serves as a reference. FIG. 8 illustrates SER as the pixel position of the change portion 212R, AFR as the pixel position of the change portion 208R, and AFL as the pixel position of the change portion 208L.

Next, as illustrated in FIG. 8, pixel position AFM between (in the middle of) the pixel position AFR of the change portion 208R and the pixel position AFL of the change portion 208L is determined. The pixel position AFM is also the pixel position when the position at the right edge of the image 84 of the adjustment pattern is assumed to be the 0th pixel. Next, the position of the pixel position AFM is calculated when the change portion 212R serves as a reference edge, in other words, when the pixel position SER of the change portion 212R is assumed to be the 0th pixel. This can be calculated by subtracting the pixel position SER from the pixel position AFM. FIG. 10 illustrates the position (pixel position) as AF. The AF indicates the position of the identified fold line. It is to be noted that the change portion 212R is also referred to as the reference edge 212R. The reference edge 212R is the right edge of the adjustment sheet, and is the edge of the side on which the reference edge mark 214 is present.

Returning to FIG. 4, description of the flow of the adjustment processing is continued. In S112 subsequent to S110, the controller 68 obtains the difference between the position of the fold line and the reference fold position. The memory 70 stores the pixel position RF of the reference fold position with respect to the reference edge 212R. FIG. 10 illustrates an example of the pixel position RF of the reference fold position. The controller 68 calculates the differential number α of pixels between the pixel position AF of the position of the fold line and the pixel position RF of the reference fold position. The product of the differential number α of pixels and a distance D (mm) per pixel corresponds to the displacement amount of the fold position.

Next, in S114 of FIG. 4, the controller 68 functions as the fold position adjusting unit 76, and sets an adjustment amount for the position of the fold line based on the differential number α of pixels between the pixel position AF of the position of the fold line and the pixel position RF of the reference fold position. The memory 70 pre-stores the distance D (mm) per pixel. As illustrated in FIG. 10, when the position AF of the identified fold line is on the left side of the reference fold position RF which is expected be the position of the fold line (when the differential number α of pixels is a positive value), an amount adjustments is set so that the position of the fold line is moved to the right side (closer to the reference edge 212R) and matches the reference fold position RF. On the other hand, when the position AF of the identified fold line is on the right side of the reference fold position RF which is expected be the position of the fold line (when the differential number α of pixels is a negative value), an amount adjustments is set so that the position of the fold line is moved to the left side (away from the reference edge 212R) and matches the reference fold position RF. The absolute value of the adjustment amount is the product of the differential number α of pixels and the distance D per pixel. The calculated adjustment amount stored in the memory 70 in association with the type of paper and the fold pattern (set in FIGS. 5B and 5C). The adjustment amount is used when a user issues an instruction for fold processing on the recording paper via the UI 72 or the PC in a normal time.

The above-described flow of FIG. 4 is performed for each type of paper and for each fold pattern, and an adjustment amount corresponding to the type and fold pattern is stored in the memory 70. When a user issues an instruction for fold processing on the recording paper via the UI 72 or the PC, an adjustment amount corresponding to the set type of paper and fold pattern is read from the memory 70, and the fold position of the fold unit 18 is adjusted by the adjustment amount. In this manner, the controller 68 (the fold position adjusting unit 76) adjusts the fold position of the fold unit 18 based on the difference between the position of the identified fold line of the adjustment sheet and the reference fold position. It is to be noted that adjustment of the fold position is made, for instance, by adjusting the gate 62 of the fold mechanism illustrated in FIGS. 2A and 2B.

With the above-described image processing device 10 in this exemplary embodiment, fold position adjustment can be made more simply, as compared with the case where a displacement amount of the fold position is manually measured and fold position adjustment is made. In addition, fold position adjustment can be made more accurately, as compared with the case where a displacement amount of the fold position is manually measured and fold position adjustment is made.

In the above-described image processing device 10 in this exemplary embodiment, description is given using half fold having one fold line in the recording paper as an example. However, needless to say, inner triple fold and Z fold having two or more fold lines in the recording paper may be selected. In this case, an adjustment pattern is printed at each of multiple fold positions of one adjustment sheet. For each of multiple fold positions of one adjustment sheet, the difference (displacement amount) between the fold position and the reference fold position is determined, and an adjustment amount for the fold position is obtained. In other words, when a fold pattern has two or more fold lines in the recording paper, adjustment amounts for multiple fold positions are obtained by one adjustment sheet.

In the above-described image processing device 10 in this exemplary embodiment, an adjustment pattern filled with color at a fixed concentration is printed (formed) on the adjustment sheet. The fold unit 18 then performs fold processing across the adjustment pattern, unfolds the folded adjustment sheet, and reads the adjustment pattern by the image reader 14, thereby obtaining the image of the adjustment pattern in which the position of a fold line appears. In the image of the adjustment pattern, the control described below may be performed so that the position of a fold line remarkably appears.

When forming the image of the adjustment pattern on the adjustment sheet, the image former 12 delays the speed of the adjustment sheet which is passed through the fixing unit 24, as compared with the case where an image is formed on the recording paper (print medium) other than the adjustment sheet. Alternatively, when forming the image of the adjustment pattern on the adjustment sheet, the image former 12 increases a fixing temperature of the fixing unit 24, as compared with the case where an image is formed on the recording paper (print medium) other than the adjustment sheet. One of or both of the above approaches may be performed. The gloss (degree of brilliance) of the adjustment pattern of the adjustment sheet is enhanced by these approaches. Accordingly, the contrast between the fold line and the portion other than the fold line is enhanced in the image of an adjustment pattern, and thus the fold line appears more remarkably.

Also, when reading the adjustment pattern of the adjustment sheet, the image reader 14 increases the light quantity of the light source 52, as compared with the case where an image formed on the recording paper (print medium) other than the adjustment sheet is read. Or when reading the adjustment pattern of the adjustment sheet, the image reader 14 increases the gain of the amplifier of a light receiver (CCD 56), as compared with the case where an image formed on the recording paper (print medium) other than the adjustment sheet is read. One of or both of the above approaches may be performed. Accordingly, the contrast between the fold line and the portion other than the fold line is enhanced in the image of an adjustment pattern, and thus the fold line appears more remarkably.

The above-described image processing device 10 may be called an image forming device. Also, the above-described "adjustment sheet" may be called a sheet for identifying the position of a fold line of the fold unit 18 that folds a sheet of paper.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image processing device comprising:
at least one processor configured to execute a fold unit configured to control folding an adjustment sheet, in which an adjustment pattern is formed, over the adjustment pattern using a predetermined reference fold position;
an image reader configured to read an image of the adjustment pattern of the adjustment sheet with the adjustment sheet folded by the fold unit unfolded;
wherein the at least one processor is further configured to execute:

a position identifying configured to identify, using a fold line which appears in the image of the adjustment pattern read by the image reader, a position of the fold line; and a fold position adjusting unit configured to adjust a fold position of the fold unit using a difference between the position of the fold line identified by the position identifying unit and the reference fold position, wherein the adjustment pattern is a pattern which is formed in at least part of an area in which the adjustment sheet is folded, and wherein the adjustment pattern is filled with color at a fixed concentration.

2. The image processing device according to claim 1, wherein the position identifying unit is configured to identify a position or a predetermined position of an area in which a concentration significantly decreases, as the position of the fold line, in a crossing direction crossing a direction along the fold of the adjustment sheet.

3. The image processing device according to claim 2, wherein the position identifying unit is configured to identify a central position of the area in which the concentration significantly decreases, as the position of the fold line, in the crossing direction.

4. The image processing device according to claim 3, wherein at least one corner area of the adjustment sheet is labeled with a reference edge mark that indicates an edge serving as a reference in the crossing direction of the adjustment sheet, wherein the image reader includes a platen on which the adjustment sheet may be placed, and wherein the adjustment sheet is placed on the platen in accordance with a position with which the reference edge mark is labeled.

5. The image processing device according to claim 4, wherein the image reader is configured to, if the adjustment sheet is placed away from an edge of the platen of the image reader, obtain the image of the adjustment pattern, in which an outer area of the adjustment sheet appears accordingly, and wherein the position identifying unit is configured to identify the position of the fold line using the outer area of the adjustment sheet and the fold line which appear in the image of the adjustment pattern.

6. The image processing device according to claim 2, wherein at least one corner area of the adjustment sheet is labeled with a reference edge mark that indicates an edge serving as a reference in the crossing direction of the adjustment sheet, wherein the image reader includes a platen on which the adjustment sheet may be placed, and wherein the adjustment sheet is placed on the platen in accordance with a position with which the reference edge mark is labeled.

7. The image processing device according to claim 6, wherein the image reader is configured to, if the adjustment sheet is placed away from an edge of the platen of the image reader, obtain the image of the adjustment pattern, in which an outer area of the adjustment sheet appears accordingly, and wherein the position identifying unit is configured to identify the position of the fold line using the outer area of the adjustment sheet and the fold line which appear in the image of the adjustment pattern.

8. The image processing device according to claim 7, wherein the image former is configured to, when forming the image of the adjustment pattern on the adjustment sheet, increase a fixing temperature of the fixing unit, as compared with a case where an image is formed on a print medium other than the adjustment sheet.

9. The image processing device according to claim 1, further comprising:

an image former comprising a developing roller, a photoconductor drum and a transfer belt, wherein the image former is configured to form an image on a print medium including the adjustment sheet by an electrophotographic system, wherein the image former includes a fixing unit configured to fix a toner transferred to the print medium, and wherein the image former is configured to, when forming the image of the adjustment pattern on the adjustment sheet, reduce a speed of the adjustment sheet which is passed through the fixing unit, as compared with a case where an image is formed on a print medium other than the adjustment sheet.

10. The image processing device according to claim 1, wherein the image reader includes a light source configured to irradiate with light a print medium including the adjustment sheet, and wherein the image reader is configured to, when reading the adjustment pattern of the adjustment sheet, increase a light quantity of the light source, as compared with a case where an image formed on a print medium other than the adjustment sheet is read.

11. The image processing device according to claim 1, wherein the image reader includes a light receiver configured to receive reflection light of irradiation light irradiated to a print medium including the adjustment sheet, and wherein the image reader is configured to, when reading the adjustment pattern of the adjustment sheet, increase a gain of the light receiver, as compared with a case where an image formed on a print medium other than the adjustment sheet is read.

12. The image processing device according to claim 1, wherein the fold position adjusting unit configured to adjust the fold position of the fold unit for each of types of paper by performing processing of each of the fold unit, the image reader, the position identifying unit, and the fold position adjusting unit on an adjustment sheet for each of the types of paper.

13. The image processing device according to claim 1, wherein the fold position adjusting unit configured to adjust the fold position of the fold unit for each of types of fold patterns by performing processing of each of the fold unit, the image reader, the position identifying unit, and the fold position adjusting unit for each of the types of fold patterns.

14. A method comprising:

folding an adjustment sheet, in which an adjustment pattern is formed, over the adjustment pattern using a predetermined reference fold position;

reading an image of the adjustment pattern of the adjustment sheet with the folded adjustment sheet unfolded;

identifying, using a fold line which appears in the read image of the adjustment pattern, a position of the fold line; and adjusting a fold position in the folding using a difference between the identified position of the fold line and the reference fold position, wherein the adjustment pattern is a pattern which is formed in at least part of an area in which the adjustment sheet is folded, and wherein the adjustment pattern is filled with color at a fixed concentration.

15. An image forming device comprising:

at least one processor configured to control forming an adjustment sheet comprising a pattern filled with color at a fixed concentration formed in an area which is to be folded by a fold unit using a predetermined reference fold position, wherein the at least one processor is configured to identify, using a fold line which appears in a read image of the pattern, a position of the fold line, and wherein the at least one processor is configured to adjust a fold position of the fold unit using a difference between the identified position of the fold line and the reference fold position.

* * * * *